INVENTOR
COLIN DARWENT
BY Young + Thompson
ATTORNEYS

United States Patent Office 3,444,819
Patented May 20, 1969

3,444,819
HYDRAULIC MOTORS AND PUMPS
Colin Darwent, Benhall, England, assignor to Telehoist Limited, Cheltenham, England
Filed May 8, 1967, Ser. No. 636,994
Claims priority, application Great Britain, July 16, 1966, 32,063/66
Int. Cl. F04c *1/02*
U.S. Cl. 103—125      9 Claims

ABSTRACT OF THE DISCLOSURE

The application relates to hydraulic motors or pumps of the type in which a stator houses a rotor the periphery of which is of cut-away form to provide pressure reaction surfaces and at least one rotatable sealing member which is disposed at the periphery of and turns with the rotor for sealing engagement with the cut-away portion of the latter. The motor or pump has a stator split into two portions for assembly axially around the rotor but with each sealing member bore extending through to the end of one of the stator portions at which end it is blanked off by a closure plug.

---

Figure 1:
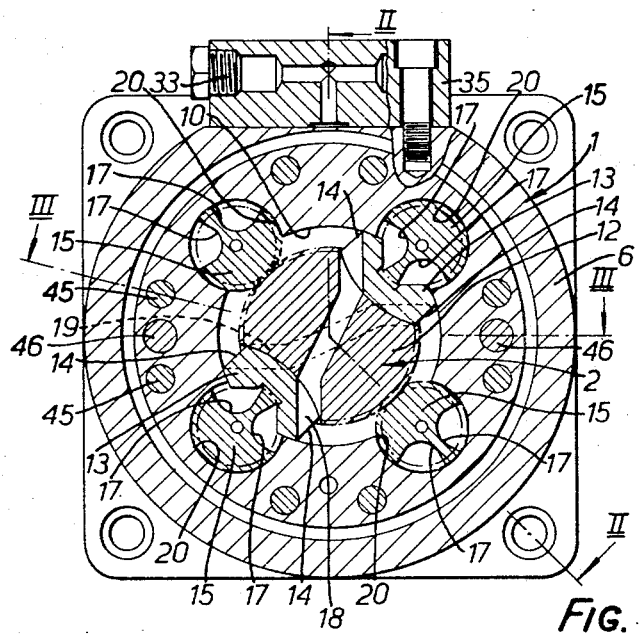

This invention relates to hydraulic motors and pumps of the type in which a stator houses a rotor the periphery of which is of cut-away form to provide pressure reaction surfaces and at least one rotatable sealing member which is disposed at the periphery of and turns with the rotor for sealing engagement with the cut-away portion of the latter. The sealing member is also cut away to allow passage of the uncut-away portion or portions of the rotor and opposite sides of the sealing member respectively communicate with inlet and outlet ports.

Motors and pumps of the foregoing type normally have a split stator for assembly around the rotor from opposite axial ends of the rotor shaft. The machining of the two portions of the stator to form the housing bores for the rotor and the sealing member or members, which may for example be four in number, is an extremely complicated and expensive procedure. Each sealing member bore is formed in two blind bore sections respectively formed in the stator portions. The bores have to be finished to normal hydraulic tolerances, accurately lapped and honed, and the main problem is to obtain satisfactory alignment of the blind bore sections in the two stator portions.

The object of the invention is to provide a motor or pump with a stator construction which considerably simplifies accurate machining of the stator bores.

According to the invention a hydraulic motor or pump of the foregoing type has a stator split into two portions for assembly axially around the rotor but with each sealing member bore extending through to the end of one of the stator portions at which end it is blanked-off by a closure plug. It will be appreciated that although the stator will normally be stationary, allowing the rotor to rotate as in a normal motor or pump arrangement, if desired the rotor can be held stationary and the stator allowed to rotate around it and the terms "rotor" and "stator" as used herein are to be construed accordingly.

As a result of the invention the bores for the sealing members can be finished with the stator portions fitted together from the corresponding end of the stator before the closure plugs are fitted, and the closure plugs for all the sealing member bores when a plurality are present are conveniently disposed at the same end of the stator. Preferably each closure plug is retained by a circlip or the like, and is provided with a seal such as an O-ring; alternatively, each sealing member bore may be counterbored and screw-threaded for a screwed closure plug.

Figure 2:
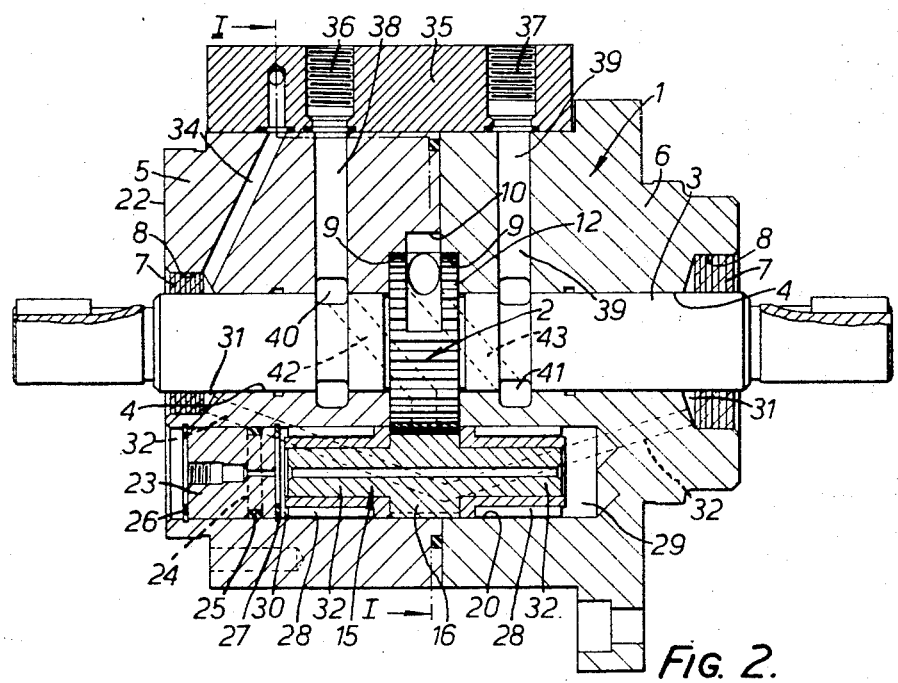
Figure 3:
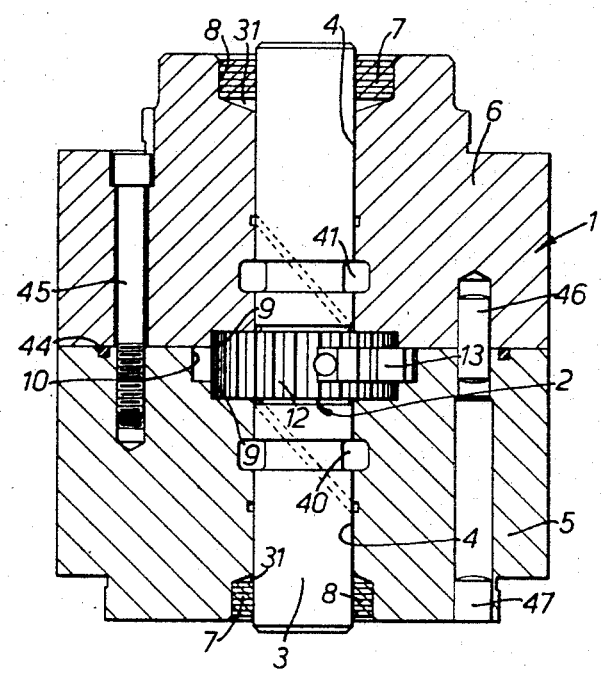

The invention will now be further described with reference to the accompanying drawings which illustrate, by way of example, a hydraulic motor (or pump) in accordance with the invention. In the drawings:

FIGURE 1 is a diametral sectional view on the line I—I in FIGURE 2,
FIGURE 2 is a sectional view on the line II—II in FIGURE 1, and
FIGURE 3 is a sectional view on the line III—III in FIGURE 1.

The motor has a stator 1 which houses a central rotor 2 mounted on an integral double-ended rotor shaft 3. The two ends of the shaft 3 respectively project through bearings 4, machined in portions 5 and 6 of the stator 1, and oil seals 7 at the opposite ends of the stator. The latter is split in a diametral plane into the two portions 5 and 6 for assembly around the rotor from the opposite ends respectively of the shaft 3.

Thus each portion 5 or 6 has a through bore which provides a seal housing 8 and shaft bearing 4, and which opens out at the interface of the portions to provide a bore or working chamber for the rotor 2. This bore is of stepped form, being basically cylindrical at 9 with a central annular groove 10 of rectangular cross-section which commences at the interface of the portions 5 and 6 and thus is disposed entirely in the portion 5. Thus the interface is offset with respect to the central rotor plane by half the width of the central groove 10.

The rotor 2 has a central section 12 in the form of a toothed spur gear which fits closely within the cylindrical form 9 of the rotor bore, and two similar and radially projecting vanes 13 which are diametrically opposed and fit closely within the annular groove 10. Thus the vanes 13, which are let into section 12, in effect provide a cut-away formation for the rotor 2 with the ends 14 of the vanes 13 providing reaction surfaces which react against hydraulic fluid supplied to the working chamber of the motor under pressure.

Four sealing members 15 in the form of rollers engage the rotor 2 and are equi-angularly arranged around the periphery of the latter. The members 15 are of stepped cylindrical form (see FIGURE 2) with a central increased diameter section 16 which is externally toothed and meshes with the teeth on the rotor section 12, so as to provide a seal against the cylindrical cut-away portions of the rotor 2 between the projecting vanes 13. The meshing teeth not only provide such a seal but also provide a gear drive for the sealing members 15 which thus rotate in synchronism with the rotor 2. Each member 15 has two spaced central cut-away pockets 17 (see FIGURE 1) which provide clearance for the generally V-shaped section of the vanes 13.

The pitch diameters of the rotor section 12 and sealing member sections 16 are chosen so that they rotate at the correct relative speeds, and the spaces in the working chamber between the sealing members 15 are alternately connected to pressure and exhaust ports 18 and 19 the function of which can be interchanged according to the desired direction of rotation. As shown in FIGURE 1 the ports 18 and 19 open out at the ends 14 of the vanes 13, and interconnect respectively diametrically opposite pairs of the ends 14.

Each sealing member 15 is mounted in a bore 20 which is disposed parallel to the rotor bore and breaks into the latter, and has two aligned same diameter sections respectively formed in the two stator portions 5 and 6. In the portion 5 the bores 20 continue to the outer end 22 of that portion at which they are blanked off by closure plugs such as 23 fitted after the bores 20 have been finally machined and finished with the stator portions 5 and 6 fitted together. The closure plugs 23 are of cylindrical form with a groove 24 which houses an O ring 25 to provide a seal, and they are retained by circlips such as 26. Circlips such as 27 let into the bores 20 provide inner end location for both the plugs 23.

Each bore 20 houses needle bearings 28 fitted on the corresponding sealing member 15. Outer end locations for the bearings 28 are provided by a closure plug 29 fitted into the blind section of the bore 20, and a thrust pad 30 engaging the corresponding circlip 27. Inner races of the bearings 28 fit on reduced diameter end sections of the members 15 and are stepped to engage the section 16 and the sides of the rotor 2.

Oil galleries 31 around the two ends of the rotor shaft 3 inboard of the seals 7 collect any hydraulic fluid which may escape past the shaft bearing 4. These galleries are interconnected by internal passages 32 which also communicate with the sealing member bores 20 to collect any fluid which may escape into the latter. The total volume of leakage fluid is led out to an external connection 33 through a vent passage 34 leading from the gallery 31 in the stator portion 5. The connection 33 is formed in a connecting block 35 bolted to the top of the stator 1.

Inlet and outlet connections 36 and 37, which are interchangeable according to the desired direction of rotation, are also formed in the block 35. These connections lead through internal passages 38 and 39 respectively to annular distribution chambers 40 and 41 which surround the shaft 3 within the stator 1 on opposite sides of the rotor 2 and these connect through inclined passages 42 and 43, formed in the shaft and rotor, with the described ports which open at the edges of the vanes 13. Thus pressure fluid supplied to the connection 36 acts on two diametrically opposite ends 14 of the vanes 13 to provide a torque on the rotor 2 which turns the shaft 3 in the corresponding direction, the fluid within the working chamber at the opposite ends of the vanes 13 being exhausted through the connection 37.

An O-ring seal 44, at the interface between the stator portions 5 and 6, surrounds a ring of bolts such as 45 by which the portions 5 and 6 are secured together. The bolts 45 are fitted through the portion 6, and accurate relative location of the two portions is obtained by means of dowels 46. The dowel bores are formed, after the two portions have been fitted together accurately, through the outer end of the portion 5 after which blanking plugs 47 are fitted into the portion 5.

I claim:
1. A hydraulic motor or pump comprising a stator assembly, a rotor housed within the stator assembly and having a periphery which is of cut-away form to provide pressure reaction surfaces, the stator assembly being split into two portions for assembly around the rotor from opposite axial ends thereof, and at least one rotatable sealing member which is disposed at the periphery of and rotates simultaneously with the rotor for sealing engagement with the latter, wherein each sealing member is mounted in a bore comprising a blind bore section formed in one of said stator portions and a through bore section formed in the other of the stator portions and extending through that portion, the through bore section being blanked-off by a closure plug.

2. A hydraulic motor or pump according to claim 1, wherein the stator is split into said two portions at a diametral plane offset with respect to a central plane of the rotor, and a working chamber of the latter is machined entirely in one stator portion.

3. A hydraulic motor or pump according to claim 1, wherein the or each closure plug is of cylindrical form, provided with a seal and retained by a separately fitted element within the sealing member bore.

4. A hydraulic motor or pump according to claim 3, wherein the or each closure plug retaining element is a circlip.

5. A hydraulic motor or pump according to claim 3, wherein the or each closure plug has an O-ring seal.

6. A hydraulic motor or pump according to claim 1, wherein the stator portions are bolted together and have locating dowels fitted in dowel bores drilled with the stator assembled, after which the dowel bores are blanked off.

7. A hydraulic motor or pump comprising a stator assembly, a rotor housed within the stator assembly and having a periphery which is of cut-away form to provide pressure reaction surfaces, the stator assembly being split into two portions for assembly around the rotor from opposite axial ends thereof, and at least one rotatable sealing member which is disposed at the periphery of and turns with and rotates simultaneously with the rotor for sealing engagement with the latter, wherein each sealing member is mounted in a bore having two aligned sections each of plain cylindrical form and respectively formed in the two stator portions with one of the bore sections extending through the stator portion in which it is formed and being blanked-off by a closure plug fitted into that portion.

8. A hydraulic motor or pump according to claim 7, wherein the or each sealing member is mounted in needle bearings the axial location of which is achieved by means of thrust pads mounted in the corresponding sealing member bore.

9. A hydraulic motor or pump according to claim 8, wherein axial location of one of the thrust pads is provided by a circlip which also provides inward location for the corresponding closure plug.

References Cited

UNITED STATES PATENTS

| 168,114 | 9/1875 | Titus | 91—92 |
| 508,574 | 11/1893 | Lambing | 103—125 |
| 2,360,430 | 10/1944 | Lear | 91—92 |

ROBERT M. WALKER, *Primary Examiner.*

W. J. GOODLIN, *Assistant Examiner.*